3,154,313
COMBINED SEAT AND SLED ASSEMBLY
Bernard M. Zurowski, 953 Forsyth Road, Carnegie, Pa.
Filed July 30, 1963, Ser. No. 298,615
5 Claims. (Cl. 280—18)

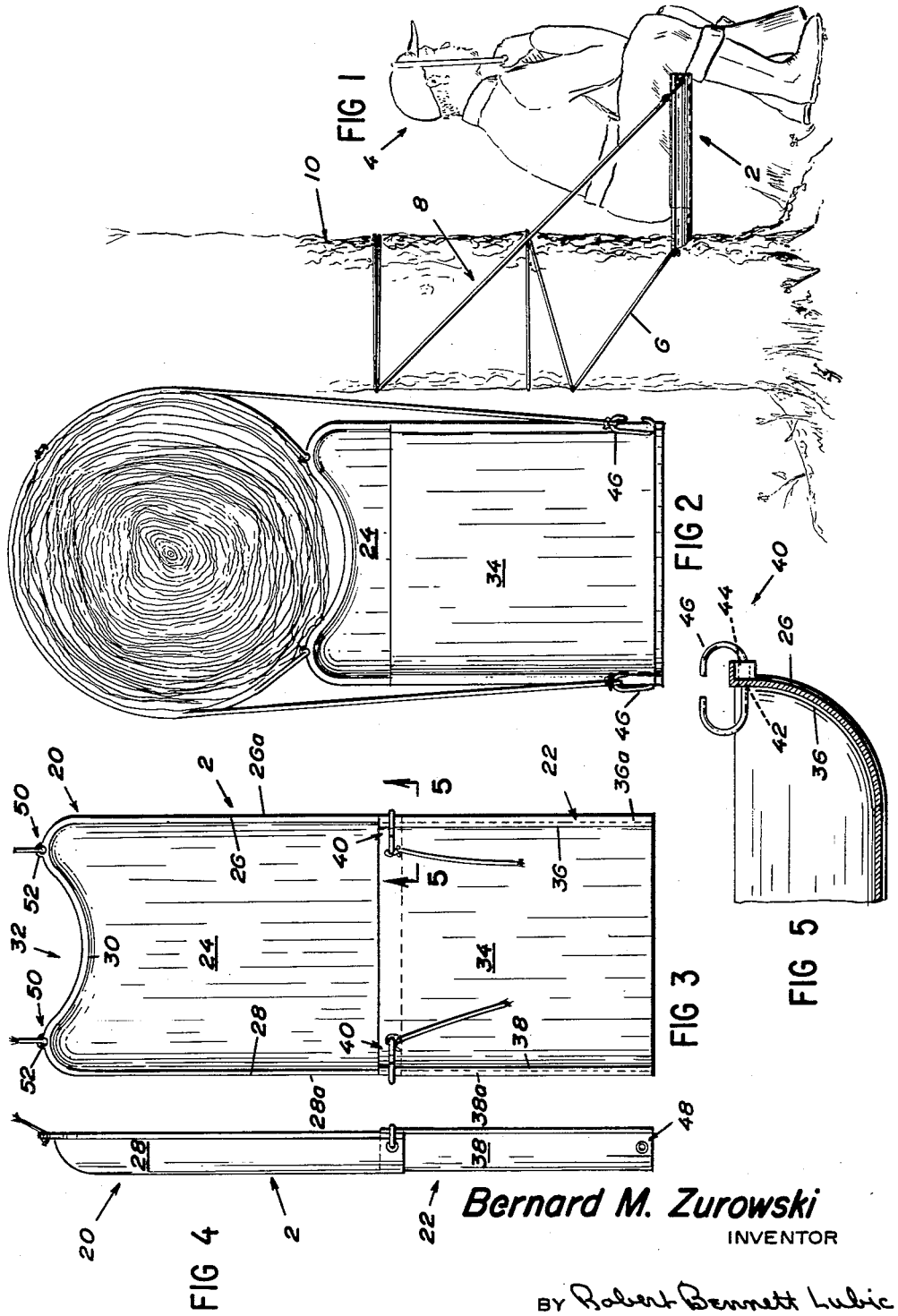
Oct. 27, 1964  B. M. ZUROWSKI  3,154,313
COMBINED SEAT AND SLED ASSEMBLY
Filed July 30, 1963  2 Sheets-Sheet 1
Bernard M. Zurowski
INVENTOR
BY Robert Bennett Lubic
ATTORNEYS Oct. 27, 1964   B. M. ZUROWSKI   3,154,313
COMBINED SEAT AND SLED ASSEMBLY
Filed July 30, 1963   2 Sheets-Sheet 2
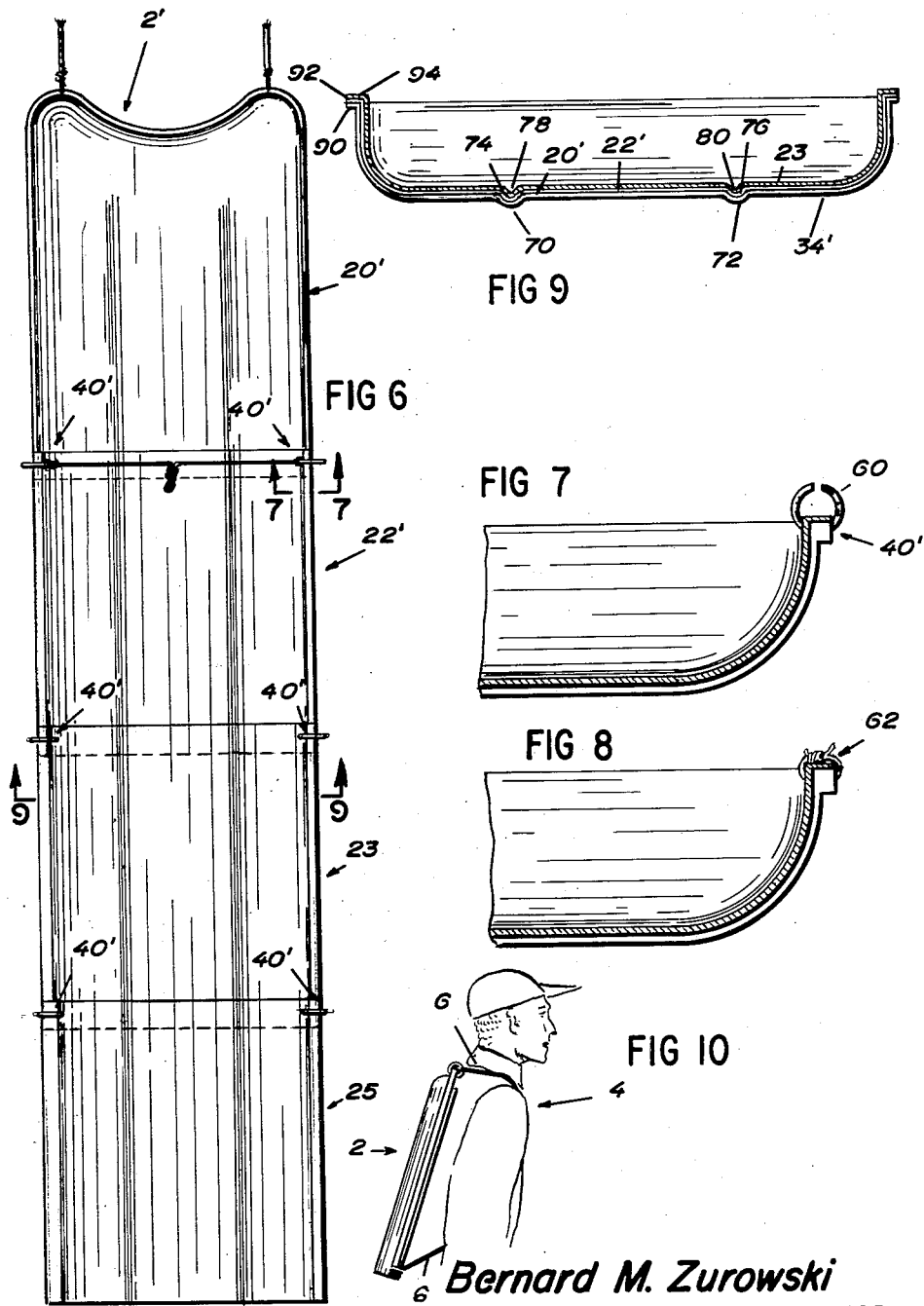
Bernard M. Zurowski
INVENTOR
BY Robert Bennett Lubic
ATTORNEYS

United States Patent Office 3,154,313
Patented Oct. 27, 1964

This invention relates to a combined seat and sled assembly, and is particularly concerned with such an assembly as formed to be transported from place to place as a pack supportable on the back of a hunter, camper, or other human.

There have been various prior suggestions as to the provision of easily portable hunters' seats, as to the provision of collapsable sleds, as to the provision of first aid litters, and the like. However, there remains a need for a combination seat and sled assembly which is of simple design, which is adapted to a number of uses, and which can be easily transported in pack form by an adult.

The primary object of the present invention is, accordingly, to provide a combination seat and sled assembly which satisfies the aforesaid need. More particularly, it is a primary object of the present invention to provide a combined seat and sled assembly (a) which is simple to use and carry; (b) which is easy to assemble as a hunter's seat or as a camp sled; (c) which is adapted, with minor modification, for use as a children's sled; (d) which can easily serve as a hunter's emergency first-aid litter; (e) which moreover can serve as a portable supply sled; and, (f) which is otherwise generally adapted, upon simple manipulation, for use as a seat or a sled, whether in dry areas or in snow laden areas.

Consistent with the above general objects, the invention has certain specific objects, including the following: (1) the provision of a combined seat and sled assembly conforming with the preceding objects, and wherein the assembly comprises a plurality of sections adapted to be collapsed and secured by means of rope to a tree or the like so as to serve as a seat, and adapted to be extended with the sections secured together for use as a sled; (2) the provision of such an assembly which can be fabricated from available materials comparatively inexpensively so as to be of use to the normal home owner, hunter, or the like; (3) the provision of such an assembly which lends itself to the hunter's use during hunting season, and which lends itself to a child's use during the winter season as a usual sled; (4) the provision of such an assembly which, when collapsed, can be transported as a pack on the back of an adult human with provisions, first-aid equipment, or other articles supported therein; (5) the provision of such an assembly which is adapted for use when formed of two sections to provide a suitable hunter's sled and seat, and which is adapted when formed of two or more sections to serve as a sled, or alternatively, a toboggan; (6) the provision of such an assembly wherein the plurality of sections forming the same engage one another to provide relative cooperating support therebetween when the sections are in extended position; (7) the provision of such an assembly which has one section thereof contoured to specifically adapt the same for attachment with a cylindrical support, such as for example a tree, whereby the assembly, as collapsed, provides an effective seat; and (8) the provision of such an assembly which can be rendered useful for any of the above-stated various purposes by simple manipulations requiring no special skill or dexterity.

The invention resides in the combination arrangement disposition and cooperation between the various component parts of an assembly constructed in accordance herewith. The invention will be better understood, and objects other than those specifically set forth above will become apparent, when consideration is given to the following detailed description. Such description refers to the annexed drawings presenting preferred and illustrative embodiments hereof. In the drawings:

FIGURE 1 is a side elevational view showing the assembly hereof as attached to a tree, and as serving as a seat for a hunter;

FIGURE 2 is a top plan view of the assembly shown in FIGURE 1, but without the hunter being seated thereon;

FIGURE 3 is a plan view of the assembly shown in FIGURE 1, but with the component sections thereof disposed in extended position whereby the assembly forms an effective sled;

FIGURE 4 is a side view of the assembly shown in FIGURE 3;

FIGURE 5 is a fragmental detailed sectional view, taken on the line 5—5 of FIGURE 3, and showing one form of securing means which can be used in accordance herewith for coupling respective sections of the assembly together;

FIGURE 6 is a plan view of a modified assembly constructed in accordance herewith, but incorporating the basic structural aspects of the preferred embodiment hereof presented in FIGURES 1 through 5;

FIGURE 7 is a detailed fragmental view taken on the line 7—7 of FIGURE 6 and showing a modified form of securing means which can be used in accordance herewith for coupling sections of the assembly together;

FIGURE 8 is a fragmental detailed view similar to FIGURE 7 but showing a further modified form of securing means which can be used in accordance herewith for coupling respective sections of the assembly together;

FIGURE 9 is a transverse sectional view taken on the line 9—9 of FIGURE 6, and presenting the inter-engaging cooperation between respective sections of an assembly constructed in accordance with the invention; and, FIGURE 10 is a fragmental elevational view showing the assembly hereof as supported on the back of an adult human.

If reference is now made specifically to FIGURE 1, it will be noted that the assembly hereof is therein generally designated by the numeral 2. The assembly, as indicated above, is in this instance, serving as a seat for the hunter, generally designated by the numeral 4. Suitable ropes 6 and 8 extend respectively between the front and rear of the assembly 2 and serve to attach the same to the tree generally designated by the numeral 10. It will be appreciated that since the assembly 2 is attached to the tree 10 by means of the ropes 6 and 8, the level of the seat provided by the assembly can be suitably adjusted during installation so as to be ultimately disposed in proper position consistent with the height of the user and his comfort desires.

Before considering the component parts of the assembly 2, as collapsed, it is helpful to consider the overall assembly in its extended or "sled" position. Accordingly, reference should now be made to FIGURES 3 and 4. As shown in these figures, the assembly 2 comprises a first section 20 and a second section 22. The first section 20 includes a bottom wall 24, a pair of opposed upstanding side walls 26 and 28 which extend along opposite sides of the bottom wall 24, and an upstanding front wall 30 which extends along the forward end of the bottom wall between the opposed upstanding side walls 26 and 28. The front wall 30 and the forward end of the bottom wall 24 are centrally recessed as at 32. The recess is arcuately symmetrical and extends inwardly over the major portion of the front of section 20. If the portion of the bottom wall 24 adjacent the section 22 is considered as the rear end, then the recess in the front wall of the section 20 extends toward the rear end of the bottom wall.

Consistent with the above discussion, the rear end of the first section 20 is open or free of obstruction so that it will receive the forward end of the second section 22 in the manner explained more fully below.

The second section 22 also has a bottom wall 34 and a pair of side walls 36 and 38 extending upwardly along opposite sides of the bottom wall 34 of the second section 22. The second section 22, as shown, is open or unobstructed at opposite ends thereof. While the open-ended construction is preferred, it should be understood that one end of the section 34 could have a wall there-across if desired, but such wall is not necessary, and without the wall, the space within the assembly can be better utilized under certain conditions such as, for example, where the assembly is serving as a pack and articles are stored therein.

As indicated by FIGURES 3 and 4, but possibly as best shown in FIGURE 2, the second section 22 is dimensioned to fit within the first section 20 with the side walls and bottom wall of the second section in underlying abutting contact with the side walls and bottom wall respectively of the first section. It is with this arrangement, i.e., where the section 22 is within the section 20, that the assembly forms a seat.

Again referring to FIGURES 3 and 4, it will be noted that cooperating means 40 are provided on each of the first and second sections 20 and 22 respectively, adjacent the mating ends thereof for securing the sections together when the second section 22 has only one end portion thereof, the forward end portion thereof as shown, within the rear end portion of the first section 20 so that the assembly forms the sled.

The cooperating means 40, consistent with the preferred embodiment hereof, and as shown in FIGURE 5, includes a pair of cooperating aligned apertures 42 and 44 disposed in the side walls 36 and 26 respectively, and a fastening device passing through the apertures. In FIGURE 5, the fastening device is shown as a C-loop 46.

Although only one cooperating means 40 has been shown in FIGURE 5, it will be understood that at least two cooperating means 40 are included, one on either side of the sled unit as shown in FIGURE 3. The construction of each cooperating means is identical, and repetition of the details of the cooperating means on the side not shown appears unnecessary.

While the cooperating means 40 have been described above as used to couple the sections 20 and 22 together whereby to provide a sled, it should be noted that the cooperating means can also serve to couple the sections together when the assembly 2 is collapsed. For this purpose, it is merely necessary to slip the C-loops out of the apertures with which they cooperate, to then reverse the section 22 so that it fits within the section 20 with the apertures again aligned with adjacent apertures in the first section, and to then replace the C-loops in a position corresponding to that shown in FIGURE 5. Alternatively, however, and to eliminate the need for manipulating the second section 22 with respect to the first section 20, a preferred modification hereof contemplates the provision of additional apertures 48 at the rear end of the side walls of the second section. With the additional apertures, once the C-loops have been removed from the sled assembly of FIGURE 3, it is merely necessary to slide the second section 22 within the first section 20 and then replace the C-loops by passing the same through aligned apertures 48 and 44 on opposite sides of the assembly and in respectively adjacent and abutting side walls of the sections.

To permit the ready attachment of the assembly 2, as collapsed, with a tree or other support of generally cylindrical shape, the first section 20 carries securing means 50 in the form of projecting eyes 52 on the front wall 30 thereof. The eyes 52 are adapted to receive a rope, such as the rope 6, in passing relation therethrough, whereby the rope can be attached to the front of the assembly, and then wrapped about a tree in a conventional manner to secure the front of the assembly to the tree. Then, an additional rope, such as the rope 8 shown in FIGURE 1, can be wrapped about the tree and then tied to respective C-loops 46 on opposite sides of the rear of the assembly to support the assembly in the manner shown in FIGURE 1.

It is realized that the terms "front" and "rear" as used herein can have different connotations depending on whether the assembly is collapsed to serve as a seat, or extended to serve as a sled. However, throughout this specification and the appended claims, the term "front" refers to that portion of the assembly at which the front wall 30 is located, and the term "rear" as used in this specification and the appended claims refers to the open end of the section 20 remote from the front wall 30.

Notwithstanding the fact that the assembly 2 has been indicated above as usable as a seat and as usuable as a sled, the same can also serve as a pack, base or frame. More specifically, when the respective sections 20 and 22 are disposed in the collapsed position of the assembly, then the assembly is readily adapted to be secured to the back of a hunter, camper, or other adult, as shown in FIGURE 10. In this figure, the assembly 2 is supported by the rope 6 on the back of the adult 4.

It has been found that if the assembly is dimensioned so as to extend, when collapsed, over the back and buttocks of an adult, it can serve the various uses set forth at the outset of the present specification. Accordingly, reference has been made herein to the assembly as supporting an adult, and as being transported by an adult. Still, it will be readily understood that the assembly is adapted to be transported by children, and to be used by children. In fact, the arrangement of FIGURE 6 finds particular utility as a child's toboggan.

Referring now more particularly to FIGURE 6, it will be noted that the assembly 2' shown therein comprises four sections, namely section 20', 22', 23, and 25. The sections 20' and 22' are, except as noted below, the same as the sections 20 and 22 described above. The unit of FIGURE 6, however, incorporates the additional sections 23 and 25 which in essence comprise extensions particularly useful to enlarge the sled.

The sections 23 and 25 are substantially identical with the section 22 or 22', and have the same basic shape in cross-section, and preferably substantially the same length. However, the fourth section 25 is dimensioned to fit within the third section 23, and in turn the third section 23 is dimensioned to fit within the second section 22' in the same nested manner that the section 22 fits within the section 20. More specifically, in the collapsed position of the unit of FIGURE 6, the section 20' would be the base section, the section 22' would fit within the section 20', the section 23 would fit within the section 22' and the section 25 would fit within the section 23. Here again, from the base section to the top section of the unit as collapsed, the respective sections would be disposed in stacked or nested relation with the bottom wall of each section being in overlying abutting relation to the bottom wall of the next downward adjacent section, and with the side walls of each section underlying and abutting the side walls of the next downward adjacent section.

As indicated above, the relationship of the additional sections to one another and to the original sections would correspond to the fitting relationship between the section 22 and the section 20 of the embodiment shown in FIGURES 2 through 4 inclusive. Bearing this fact in mind, it will be understood that the unit of FIGURE 6, with the additional sections, can as easily serve as a seat as the unit shown in FIGURES 1 through 4.

The attachment between the additional sections 23 and 25, and the attachment of such sections with the base sections 20' and 22' can be the same as shown in FIGURE 5. Specifically, the additional sections would carry apertures which will align with apertures in adjacent sections to permit the use of a C-loop such as designated by the numeral 46 and shown in FIGURE 2.

Alternative to the C-loop piece of the cooperating means 40 described above, there are other fastening techniques which can be employed. Thus, as shown in FIGURE 7, and as contemplated with the unit of FIGURE 6, a circular loop 60 is provided. This loop passes through aligned apertures 42 and 44 just as the C-loop 46 passes therethrough. The circular loop 60 is open between its ends to permit its insertion through the apertures as indictaed. A still further alternative, and one which eliminates the problem of "lost pieces," is shown in FIGURE 8. Here, the C-loop 46 and the circular loop 60 of other embodiments are replaced merely by a piece of wire or rope generally designated by the numeral 62. Such rope is passed through the aligned apertures and then tied in a knot to achieve the desired connection between respective sections. The cooperating means of FIGURE 7 is designated by the numeral 40' since it corresponds closely with the cooperating means 40 of FIGURE 5, and in fact includes the same apertures. With this understanding, it will be noted from FIGURE 6 that cooperating means 40' are used to secure respective successive sections 200', 22', 23, and 25 to one another on opposite sides of the extended assembly. Quite naturally, in the intermediate sections 22' and 23 additional apertures such as designated by the numeral 43 in FIGURE 4, would be provided. Additional apertures may also be provided in the end section 25 to serve the same purpose as the aperture 48 of FIGURE 4 when the assembly is collapsed.

Another point to note with respect to the cooperating means used to secure the sections together resides in the support of the assembly in collapsed position and as a seat. The circular loop 60 of the embodiment of FIGURE 7 can be attached to a rope 8 just as the C-loop 46 is attached thereto. With the modification of FIGURE 8, the rope 8 itself could be passed through the aligned apertures, as opposed to being attached to a loop. Still, the basic support and the basic cooperation between the components is the same regardless of the fastener incorporated.

It has been assumed in the preceding discussion that the bottom walls of each of the sections are planar or flat. The provision of flat bottom walls has been found to be entirely satisfactory, but a modification renders the overall assembly somewhat more stable, and facilitates the movement thereof over rough areas. Specifically, reference should now be made to FIGURE 9. This figure was taken on the line 9—9 of FIGURE 6 and thus represents a sectional view looking forward from the section 23 of the assembly of FIGURE 6.

From FIGURE 9, it will be noted that with the respective sections in extended position as shown in FIGURE 6, the section 23 is, by comparison, at the uppermost level, the section 22' is at the next lower level, and the section 20' is at the lower level. In operation, each section may be slightly tilted from its forward end toward its rear end, and FIGURE 9 may not be completely accurate in this sense. Still, FIGURE 9 shows the relative disposition of the respective sections and the generally telescoping fit therebetween. Still further, FIGURE 9 illustrates the modification referred to immediately above, and explained immediately below.

The bottom wall 34' of the section 20' is shown as having offset portions 70 and 72 which project from the bottom surface of the wall 34' as ribs, and which, at the same time, form depressions in the upper surface of the bottom wall 34'. Similar offset portions 74 and 76 are provided in the bottom wall of the section 22' and in the bottom wall of the section 23. Accordingly, consistent with this modification, the bottom walls of the respective sections have cooperating longitudinally extending grooves and projections. Such projections tend to stabilize the overall assembly, preventing lateral slip between sections, and further serve as runners on the base of the assembly as extended, thus facilitating the movement thereof over rough areas. Of course, the cooperating ribs or projections and recesses also serve in an auxiliary fashion as guides when the sections are collapsed by pushing the same inwardly toward the front wall 30.

The modification of FIGURE 9 is equally applicable to the embodiment of FIGURES 2 through 4 as it is to the embodiment of FIGURE 6, and it is accordingly intended that the two-section assembly hereof can also have cooperating ribs or projections and recesses in engaging bottom walls.

As a further stability factor, and whether or not the ribs and grooves are provided, it is preferable to form the side walls of the respective sections with outwardly extending flanges such as the flanges 90, 92 and 94 shown in FIGURE 9. In fact, the walls 26 and 28 of the embodiment of FIGURE 3 carry flanges 26a and 28a and the side walls 36 and 38 similarly carry flanges 36a and 38a. These flanges, like the flanges shown in FIGURE 9 are so dimensioned on the respective sections that when the sections overlie one another, the flanges of the rearmost section are disposed on top of the flanges of the next forward section. In addition to stabilizing the respective sections on one another, the flanges provide support for the fasteners of the cooperating means which are located thereadjacent.

One modification not mentioned in detail above resides in the provision of reinforcements adjacent the apertures forming part of the cooperating means 40 or 40'. The sections of the assembly can be formed from various materials, including plastics, aluminum, other suitable metals, and the like. Plexiglas, however, has proved particularly satisfactory because of its smooth surface properties. With Plexiglas, and with certain other plastics in particular, the use of reinforcing gussets within the apertures of the cooperating means 40 or 40' is preferred.

After reading the foregoing detailed description of the illustrative embodiments presented in the annexed drawings, it should be apparent that the objects set forth at the outset of the present specification have been successfully achieved. Accordingly, what is claimed is:

1. A combined seat and sled assembly comprising a first section having a bottom wall, a pair of opposed upstanding side walls extending along opposite sides of said bottom wall, and an upstanding front wall extending along the forward end of said bottom wall between said opposed upstanding side walls, said front wall and the forward end of said bottom wall being centrally arcuately symmetrically inwardly recessed over the major portion thereof and toward the rear end of said bottom wall, the rear of said first section being open, a second section also having a bottom wall and a pair of side walls extending upwardly along opposite sides of said bottom wall of said second section, said second section having at least one open end, said second section being dimensioned to fit within said first section with the side walls and bottom wall of said first section in underlying abutting contact with the side walls and bottom wall respectively of said second section whereby said assembly forms a seat, cooperating means on each of said first and second sections adjacent at least one end thereof for securing said sections together when said second section has only one end portion thereof within the rear end portion of said first section whereby said assembly forms a sled, securing means carried by said first section, and rope means for cooperation with said securing means to secure said assembly as a seat to an at least generally cylindrical support when said second section is substantially fully disposed within said first section.

2. A combined seat and sled assembly as defined in claim 1 wherein said upstanding side walls of said first section carry outwardly extending first flanges along the upper ends thereof, and said upstanding side walls of said second section carry outwardly extending second flanges along the upper ends thereof, said second flanges being disposed to overlie adjacent portions of said first flanges.

3. A combined seat and sled assembly as defined in claim 1 wherein said bottom walls of said first and second sections have cooperating longitudinal grooves and projections in the bottom walls thereof to stabilize said sections with respect to one another.

4. A combined seat and sled assembly as defined in claim 1 wherein said securing means comprises a pair of eyes disposed on said front wall of said first section on opposite sides of the recess therein, and wherein said cooperating means comprises pairs of aligned apertures with fastening means passing therethrough.

5. A combined seat and sled assembly as defined in claim 1 and further including third and fourth sections shaped laterally identically as said second section, said third section being dimensioned to fit within said second section, and said fourth section being dimensioned to fit within said third section in the same manner that said second section fits within said first section, said second, third and fourth sections carrying cooperating means thereon for securing said sections together when the end portion only of each section is within the rear end portion of the next forward adjacent section.

References Cited in the file of this patent
UNITED STATES PATENTS

| | | |
|---|---|---|
| 1,083,707 | Sparenburg | Jan. 6, 1914 |
| 2,464,016 | Berg | Mar. 8, 1949 |
| 2,927,799 | Schnitzler | Mar. 8, 1960 |
| 3,017,194 | Anderson | Jan. 16, 1962 |